(12) United States Patent
Schwie et al.

(10) Patent No.: US 12,455,295 B2
(45) Date of Patent: Oct. 28, 2025

(54) CONFORMAL MULTI-FUNCTION AIR-DATA PROBES

(71) Applicant: Rosemount Aerospace Inc., Burnsville, MN (US)

(72) Inventors: Chester M. Schwie, Burnsville, MN (US); Rudy L. Pitera, Inver Grove Heights, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 321 days.

(21) Appl. No.: 18/235,188

(22) Filed: Aug. 17, 2023

(65) Prior Publication Data

US 2025/0060389 A1 Feb. 20, 2025

(51) Int. Cl.
*G01P 5/16* (2006.01)
*G01P 5/165* (2006.01)

(52) U.S. Cl.
CPC .................................. *G01P 5/165* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18;
(Continued)

(56) References Cited

U.S. PATENT DOCUMENTS

| 4,836,019 A | 6/1989 | Hagen et al. |
| 5,601,254 A | 2/1997 | Ortiz et al. |

(Continued)

FOREIGN PATENT DOCUMENTS

| CN | 109877314 A | 6/2019 |
| WO | WO 9109274 A * | 6/1991 |

OTHER PUBLICATIONS

European Search Report received in EP Application No. 24194674.3.0, Jan. 10, 2025, 8 pages.

*Primary Examiner* — Andre J Allen
(74) *Attorney, Agent, or Firm* — Suiter Swantz IP

(57) ABSTRACT

An air-data probe component includes an additively manufactured inner member. The inner member includes integrally formed, monolithic structures including a mandrel bulkhead defining a plurality of pneumatic chambers therein in fluid communication with an outer surface of the mandrel bulkhead through respective pressure ports, and a plurality of pneumatic tubes extending aft of the mandrel bulkhead along a probe axis, each in fluid communication with a respective one of the plurality of pneumatic chambers. An outer cover tip can be engaged about the mandrel bulkhead with a plurality of bores therethrough for fluid communication of outside air pressure into the plurality of pneumatic tubes through the outer cover tip. A forward surface of the outer cover tip can be flush, conformal, and continuous with an aerodynamic outer surface of an aircraft.

20 Claims, 2 Drawing Sheets

(58) Field of Classification Search
CPC .......... B64D 1/20; B64D 15/16; B64D 15/22; B64D 2033/0286; B64D 33/02; B64D 45/00; B64D 33/08
USPC ...................................................... 73/170.02
See application file for complete search history.

(56) References Cited

U.S. PATENT DOCUMENTS

| | | |
|---|---|---|
| 6,604,029 B2 | 8/2003 | Cronin et al. |
| 6,609,421 B2 | 8/2003 | Cronin et al. |
| 7,379,839 B2 | 5/2008 | Cronin et al. |
| 9,606,137 B2 | 3/2017 | Jacob et al. |
| 9,664,542 B2* | 5/2017 | Gordon ................ G01F 1/46 |
| 9,718,820 B2 | 8/2017 | Player et al. |
| 10,024,877 B2 | 7/2018 | Golly et al. |
| 10,227,139 B2* | 3/2019 | Golly ................ B64D 43/02 |
| 10,589,870 B2* | 3/2020 | Golly ................ B64D 43/02 |
| 10,884,014 B2 | 1/2021 | Golly et al. |
| 11,167,861 B2* | 11/2021 | Golly ................ G01P 5/165 |
| 11,624,637 B1 | 4/2023 | Isebrand et al. |
| 11,662,235 B2 | 5/2023 | Isebrand et al. |
| 11,731,782 B2* | 8/2023 | Golly ................ G01P 13/025 |
| | | 242/472.5 |
| 2012/0118075 A1 | 5/2012 | Golly |
| 2014/0290354 A1 | 10/2014 | Marty et al. |
| 2016/0280391 A1 | 9/2016 | Golly et al. |
| 2016/0282158 A1 | 9/2016 | Johnson et al. |
| 2016/0304210 A1 | 10/2016 | Wentland et al. |
| 2017/0052046 A1 | 2/2017 | Gordon et al. |
| 2018/0372771 A1* | 12/2018 | Moss ................ G01P 5/165 |
| 2020/0393484 A1 | 12/2020 | Johnson et al. |
| 2024/0393361 A1* | 11/2024 | Hofmeister ............ B64D 43/02 |

* cited by examiner

CONFORMAL MULTI-FUNCTION AIR-DATA PROBES

BACKGROUND

1. Field

The present disclosure relates to air-data probes, and more particularly to multi-function air-data probes.

2. Description of Related Art

A variety of air-data probe devices are known in the art for aircraft flight control. Of such devices, many are directed to measuring pitot pressure, static pressure, local angle of attack pressures, and angle of sideslip pressures as parameters for calculating pressure altitude, altitude rate, airspeed, Mach number, angle of attack, and angle of sideslip. Air-data probes can also provide data for secondary purposes including engine control, artificial feel, cabin pressure differential, and more.

During atmospheric moisture conditions, it is possible for air-data probes to have pressure sensing measurement errors or spikes due to moisture being present within chambers and conduits of the air-data probe. Such moisture includes solid and liquid moisture. During ground operation and in flight, atmospheric moisture can accumulate around and in pressure measuring ports, conduits, and chambers, potentially causing menisci to develop which affect the accuracy of the sensed pressures, and therefore affect the accuracy of the determined air speed, altitude, or other measured fluid dynamic characteristic.

Such conventional methods and systems generally have been considered satisfactory for their intended purpose. However, there remains an ever present need to advance the state of the art for improving functionality and manufacturability of air-data probes. The present invention provides a solution for these needs.

SUMMARY

An air-data probe component includes an additively manufactured inner member. The inner member includes integrally formed, monolithic structures including a mandrel bulkhead defining a plurality of pneumatic chambers therein in fluid communication with an outer surface of the mandrel bulkhead through respective pressure ports, and a plurality of pneumatic tubes extending aft of the mandrel bulkhead along a probe axis, each in fluid communication with a respective one of the plurality of pneumatic chambers.

The outer surface of the mandrel bulkhead can include a channel defined therein configured to receive heater wire coils therein wrapped around the mandrel bulkhead. The plurality of pneumatic chambers can include:
- a pitot chamber in fluid communication with a forward facing one of the pressure ports, with respect to the probe axis;
- a first chamber in fluid communication with a first lateral facing one of the pressure ports with respect to the probe axis;
- a second chamber in fluid communication with a second lateral facing one of the pressure ports with respect to the probe axis, wherein the second lateral facing one of the pressure ports is diametrically opposed to the first lateral facing one of the pressure ports across the probe axis;
- a third chamber in fluid communication with a third lateral facing one of the pressure ports opening circumferentially spaced apart from the first and second lateral facing ones of the pressure ports relative to the probe axis; and
- a fourth chamber in fluid communication with a fourth lateral facing one of the pressure ports opening diametrically opposed to the third lateral facing one of the pressure ports relative to the probe axis.

The pitot chamber can include a plurality of dams extending part way radially into the pitot chamber defining a labyrinthine path through the pitot chamber for ice and moisture damming. The plurality of dams can be integral and monolithic with the mandrel bulkhead.

The plurality of pneumatic tubes can include a first pneumatic tube in fluid communication with the pitot chamber, a second pneumatic tube in fluid communication with the first chamber, a third pneumatic tube in fluid communication with the second chamber, a fourth pneumatic tube in fluid communication with the third chamber, and a fifth pneumatic tube in fluid communication with the fourth chamber. The first, second, third, fourth, and fifth pneumatic tubes can connect their respective chambers in fluid communication with one or more pressure transducers for generating multi-function air-data probe data. The first, second, third, fourth, and fifth pneumatic tubes can extend aft from the mandrel bulkhead along the probe axis through a necking section that is radially narrower than the mandrel bulkhead relative to the probe axis. A bracer can be integral and monolithic with the first, second, third, fourth, and fifth pneumatic tubes aft of the necking section. The bracer can be radially wider than the mandrel bulkhead and radially wider than the necking section relative to the probe axis. Aft of the bracer, the first, second, third, fourth, and fifth pneumatic tubes can diverge from one another and from the probe axis as they extend in an aft direction away from the mandrel bulkhead with respect to the probe axis. Aft of the bracer, aft ends of the first, second, third, fourth, and fifth pneumatic tubes can be configured to be connected in fluid communication with one or more pressure transducers for generating multi-function air-data probe data.

An outer cover tip can be engaged about the mandrel bulkhead with a plurality of bores therethrough for fluid communication of outside air pressure into the plurality of pneumatic tubes through the outer cover tip. An inner surface of the outer cover tip and an outer surface of the mandrel bulkhead can conform to one another. A heater wire can be seated in a channel defined in the outer surface of the mandrel bulkhead. Coils of the heater wire can be enclosed between the mandrel bulkhead and the outer cover tip. An outer surface of the bracer can conform to and engages with an inner surface of the outer cover tip.

The outer cover tip can include a forward surface and an aft surface aft of the forward surface along the probe axis. The forward surface can be configured to be flush, conformal, and continuous with an aerodynamic outer surface of an aircraft. The aft surface can be configured to extend inside the aerodynamic outer surface. The outer cover tip can include a temperature probe seated in a wall of the outer cover tip that separates from an external environment and an interior space inside the outer cover tip housing the mandrel bulkhead.

A plurality of internal sensors can be in fluid communication with the plurality of pneumatic tubes for generating multi-function air-data. A data controller can be operatively connected to the plurality of internal sensors and configured to interface with an aircraft system to communicate multi-function air-data to the aircraft system.

An aircraft body defines an aerodynamic outer surface. An air-data probe includes an additively manufactured inner member as described above. An outer cover tip is engaged about the mandrel bulkhead with a plurality of bores therethrough for fluid communication of outside air pressure into the plurality of pneumatic tubes through the outer cover tip. The outer cover tip includes a forward surface and an aft surface aft of the forward surface along the probe axis, wherein the forward surface is flush, conformal, and continuous with the aerodynamic outer surface, and wherein the aft surface is configured to extend inside the aerodynamic outer surface. The aerodynamic outer surface and the outer cover tip are not integrally formed, monolithic structures with one another. The aerodynamic outer surface and the additively manufactured inner member are not integrally formed, monolithic structures with one another. The outer cover tip and the additively manufactured inner member are not integrally formed, monolithic structures with one another.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
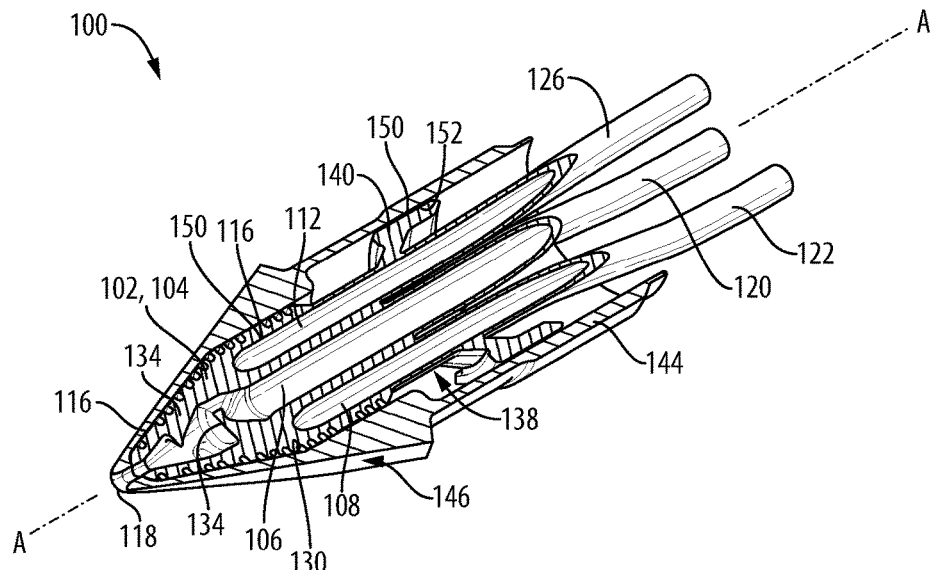
FIG. 1 is a cross-sectional perspective view of an embodiment of an air-data probe component constructed in accordance with the present disclosure, showing the additively manufactured inner member.

Reference will now be made to the drawings wherein like reference numerals identify similar structural features or aspects of the subject disclosure. For purposes of explanation and illustration, and not limitation, a partial view of an embodiment of an air-data probe component in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide additively manufactured multi-function air-data probe components that are conformal/flush with the adjacent aircraft surface.

Figure 2:
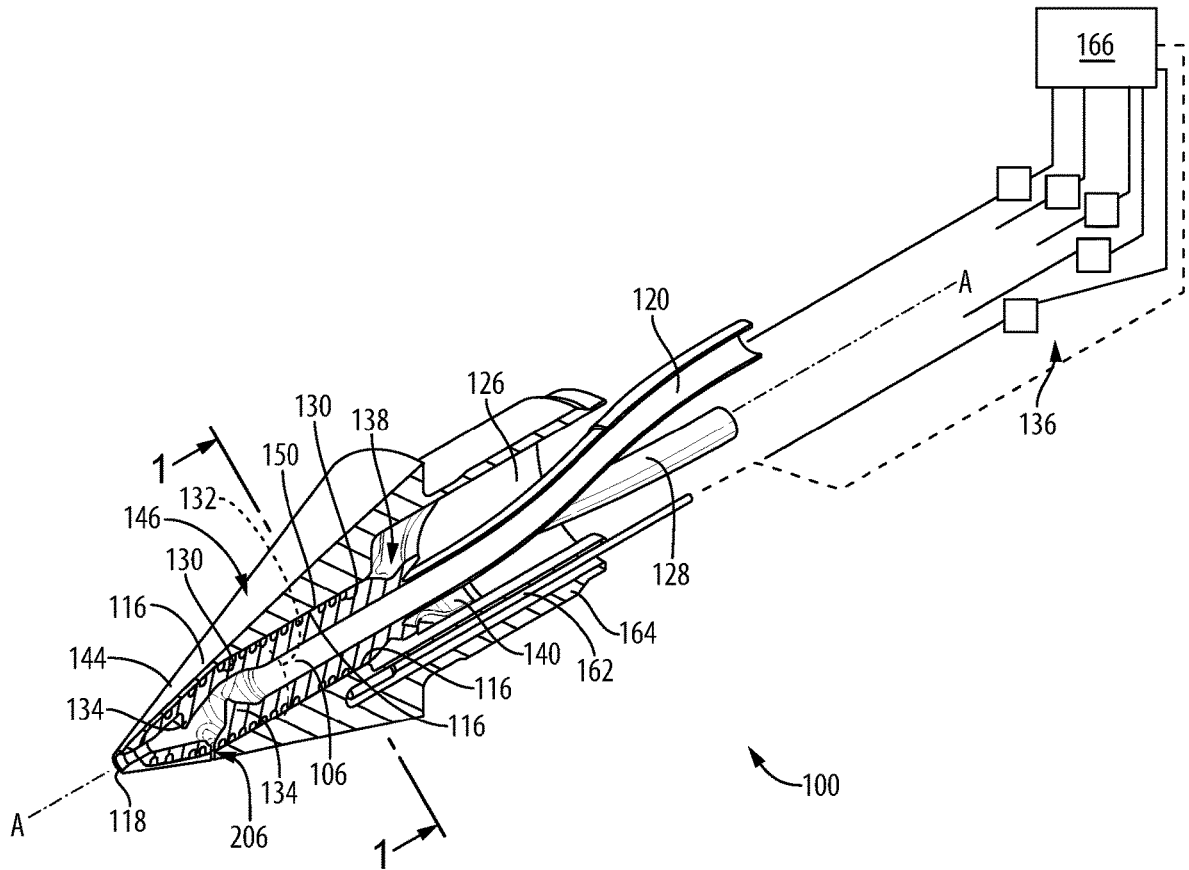
FIG. 2 is a cross-sectional perspective view of the air-data probe component of FIG. 1, showing the outer cover tip and temperature sensor.
Figure 3:
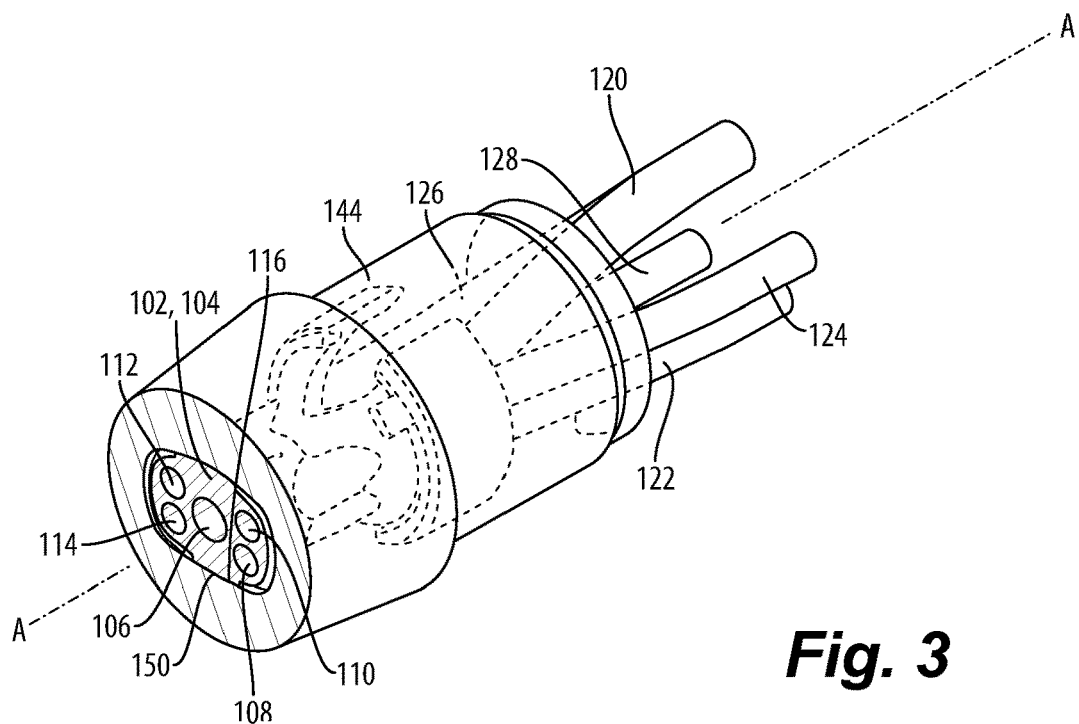
FIG. 3 is an axial end elevation cross-sectional perspective view of the air-data probe component of FIG. 1, showing the pneumatic chambers.

An air-data probe component 100 includes an additively manufactured inner member 102. The inner member 102 includes integrally formed, monolithic structures including a mandrel bulkhead 104 defining a plurality of pneumatic chambers 106, 108, 110, 112, 114 (all labeled in FIG. 3) therein in fluid communication with an outer surface of the mandrel bulkhead 116 through respective pressure ports 118, 202, 201, 204, 200 (200 is not all shown, but see FIG. 4, where 200 is indicated as opposite port 201). The integrally formed, monolithic structures of the inner member 102 include a plurality of pneumatic tubes 120, 122, 124 (labeled in FIG. 3), 126, 128 (labeled in FIG. 2) extending aft of the mandrel bulkhead 104 along a probe axis A, each in fluid communication with a respective one of the plurality of pneumatic chambers 106, 108, 110, 112, 114. As shown in FIG. 2, the outer surface 116 of the mandrel bulkhead 104 includes one or more channels 130 defined therein configured to receive heater wire coils 132 therein wrapped around the mandrel bulkhead 104.

The plurality of pneumatic chambers 106, 108, 110, 112, 114 includes a pitot chamber 106 in fluid communication with a forward facing one of the pressure ports 118, with respect to the probe axis A. The chambers 108, 110, 112, 114 can all be used in combination to derive angle of attack and sideslip data, or any other suitable air data, without departing from the scope of this disclosure. A first chamber 108 is in fluid communication with a first lateral facing one of the pressure ports 202 (labeled in FIG. 4) with respect to the probe axis A. The second chamber 112 is in fluid communication with a second lateral facing one of the pressure ports 204 (labeled in FIG. 4) with respect to the probe axis A, wherein the second lateral facing one of the pressure ports 204 is diametrically opposed to the first lateral facing one of the pressure ports 202 of chamber 108 across the probe axis A. A third chamber 110 is in fluid communication with a third lateral facing one of the pressure ports 201 (labeled in FIG. 4) opening circumferentially spaced apart from the first and second lateral facing ones of the pressure ports 202 and 204 for chambers 108, 112 relative to the probe axis A. A fourth chamber 114 is in fluid communication with a fourth lateral facing one of the pressure ports 200 (indicated in FIG. 4) opening diametrically opposed to the third lateral facing one of the pressure ports 201 of chamber 110 relative to the probe axis A. The pitot chamber includes a plurality of dams 134, labeled in FIGS. 1-2, extending part way radially into the pitot chamber 106 to define a labyrinthine path through the pitot chamber for ice and moisture damming, wherein the plurality of dams 134 are integral and monolithic with the mandrel bulkhead 104. There is also a moisture management port 206 labeled in FIG. 2 for egress of moisture from the chamber 106.

The plurality of pneumatic tubes 120, 122, 124 (labeled in FIG. 3), 126, 128 (labeled in FIG. 2) includes a first pneumatic tube 120 in fluid communication with the pitot chamber 106, a second pneumatic tube 122 in fluid communication with the first AOA chamber 108, a third pneumatic tube 126 in fluid communication with the second AOA chamber 112, a fourth pneumatic tube 124 in fluid communication with the first chamber 110, and a fifth pneumatic tube 128 in fluid communication with the second chamber 114. The pneumatic tubes 120, 122, 124, 126, 128 connect their respective chambers 106, 108, 110, 112, 114 in fluid communication with one or more air-data sensors 136 (labeled in FIG. 2) such as absolute or differential pressure transducers, for generating multi-function air-data probe data. The pneumatic tubes 120, 122, 124, 126, 128 extend aft from the mandrel bulkhead 104 along the probe axis A through a necking section 138 that is radially narrower than the mandrel bulkhead 104 relative to the probe axis A. A bracer 140 is integrally formed and monolithic with the pneumatic tubes 120, 122, 124, 126, 128 aft of the necking section 138. The bracer 140 is radially wider than the mandrel bulkhead 104 and radially wider than the necking section 138 relative to the probe axis A. Aft of the bracer 140, the pneumatic tubes 120, 122, 124, 126, 128 diverge from one another and from the probe axis A as they extend in an aft direction away from the mandrel bulkhead 104 along the probe axis A.

An outer cover tip 144 is engaged about the mandrel bulkhead 104 with a plurality of bores 146 (labeled in FIGS. 1, 2, and 4) therethrough for fluid communication of outside air pressure into the pneumatic tubes 120, 122, 124, 126, 128 through the outer cover tip 144. The outer cover tip 144 is not integrally formed with or monolithic with the inner member 102.

An inner surface 150 of the outer cover tip 144 and the outer surface 116 of the mandrel bulkhead 104 conform to one another, enclosing coils of the heater wire 132 (labeled in FIG. 2) seated the channel 130 defined in the outer surface 116 of the mandrel bulkhead 104 between the mandrel bulkhead 104 and the outer cover tip 144. An outer surface 152 of the bracer 140 conforms to and engages with the inner surface 150 of the outer cover tip 144.

Figure 4:
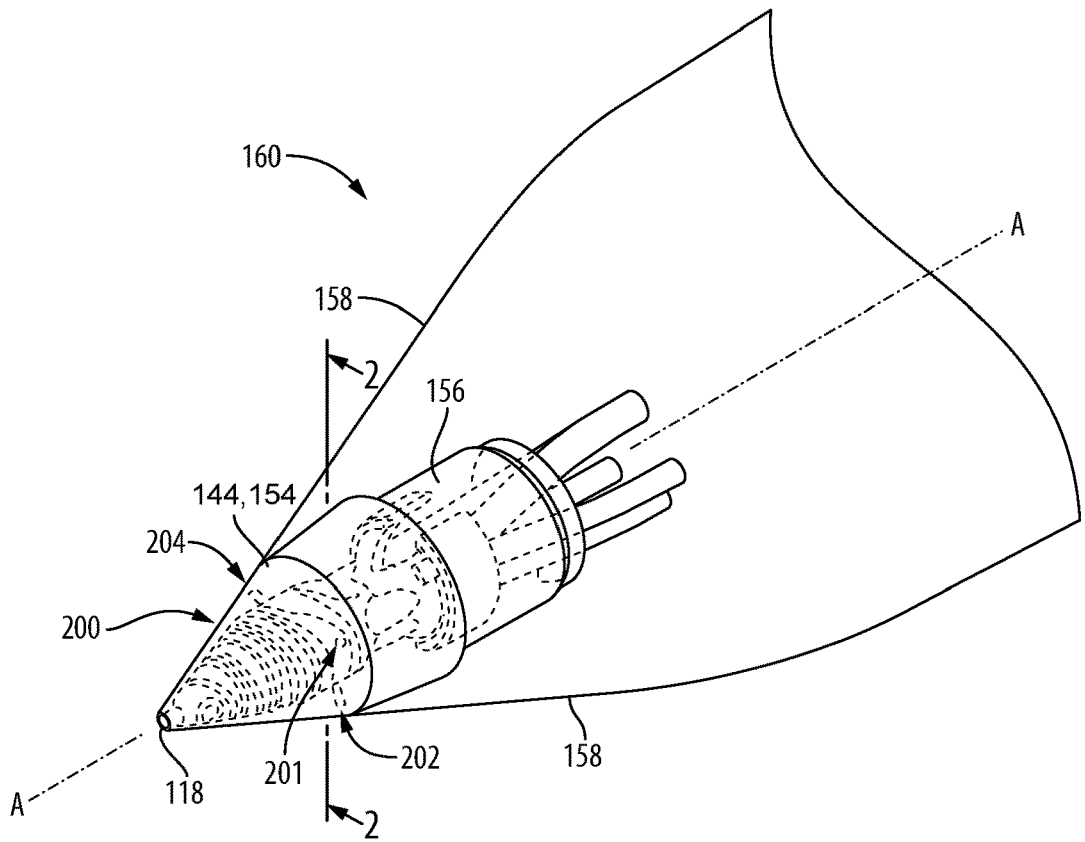
FIG. 4 is a perspective view of the air-probe component of FIG. 1, showing the flush, conformal, and continuous relationship of the outer cover tip with the aerodynamic outer surface of an aircraft.

Referring now to FIG. 4, the outer cover tip 144 includes a forward surface 154 and an aft surface 156 that is aft of the forward surface 154 along the probe axis A. The aft surface 156 is stepped radially inward relative to the forward surface 154. The forward surface 154 is configured to be flush, conformal, and continuous with an aerodynamic outer surface 158 of the body of an aircraft 160. The aerodynamic outer surface 158 and the outer cover tip 144 are not integrally formed, monolithic structures with one another. The aerodynamic outer surface 158 and the additively manufactured inner member 102 (labeled in FIGS. 1-3) are not integrally formed, monolithic structures with one another. The outer cover tip 144 and the additively manufactured inner member 102 (labeled in FIGS. 1-3) are not integrally formed, monolithic structures with one another.

Referring again to FIG. 2, the aft surface 156 is configured to extend inside the aerodynamic outer surface 158 of the aircraft 160 (labeled in FIG. 4), for connecting the air-data probe component 100 internals, e.g., connecting the pressure transducers 136 of the air-data probe with aircraft systems for generating and communicating air-data, e.g., for use in control of the aircraft 158. A data controller 166 is operatively connected to the plurality of internal sensors 136 and is configured to interface with an aircraft system, such as avionics of the aircraft 158 shown in FIG. 4, to communicate multi-function air-data to the aircraft system. The outer cover tip 144 includes a temperature probe 162 seated in the wall 164 of the outer cover tip 144 that separates from an external environment and an interior space inside the outer cover tip 144 housing the mandrel bulkhead 104. The temperature probe 162 is also connected to the controller 166 for generating air data.

Systems and methods as disclosed herein provide potential benefits including the following. They can provide simplified production methods. They can also provide improved performance.

The methods and systems of the present disclosure, as described above and shown in the drawings, provide for additively manufactured multi-function air-data probe components that are conformal/flush with the adjacent aircraft surface. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An air-data probe component comprising:
an additively manufactured inner member including integrally formed, monolithic structures including:
a mandrel bulkhead defining a plurality of pneumatic chambers therein in fluid communication with an outer surface of the mandrel bulkhead through respective pressure ports; and
a plurality of pneumatic tubes extending aft of the mandrel bulkhead along a probe axis, each in fluid communication with a respective one of the plurality of pneumatic chambers.

2. The air-data probe component as recited in claim 1, wherein the outer surface of the mandrel bulkhead includes a channel defined therein configured to receive heater wire coils therein wrapped around the mandrel bulkhead.

3. The air-data probe component as recited in claim 1, wherein the plurality of pneumatic chambers includes:
a pitot chamber in fluid communication with a forward facing one of the pressure ports, with respect to the probe axis;
a first chamber in fluid communication with a first lateral facing one of the pressure ports with respect to the probe axis;
a second chamber in fluid communication with a second lateral facing one of the pressure ports with respect to the probe axis, wherein the second lateral facing one of the pressure ports is diametrically opposed to the first lateral facing one of the pressure ports across the probe axis;
a third chamber in fluid communication with a third lateral facing one of the pressure ports opening circumferentially spaced apart from the first and second lateral facing ones of the pressure ports relative to the probe axis; and
a fourth chamber in fluid communication with a fourth lateral facing one of the pressure ports opening diametrically opposed to the third lateral facing one of the pressure ports relative to the probe axis.

4. The air-data probe component as recited in claim 3, wherein the pitot chamber includes a plurality of dams extending part way radially into the pitot chamber defining a labyrinthine path through the pitot chamber for ice and moisture damming, wherein the plurality of dams are integral and monolithic with the mandrel bulkhead.

5. The air-data probe component as recited in claim 3, wherein the plurality of pneumatic tubes includes:
a first pneumatic tube in fluid communication with the pitot chamber;
a second pneumatic tube in fluid communication with the first chamber;
a third pneumatic tube in fluid communication with the second chamber;
a fourth pneumatic tube in fluid communication with the third chamber; and
a fifth pneumatic tube in fluid communication with the fourth chamber.

6. The air-data probe component as recited in claim 5, wherein the first, second, third, fourth, and fifth pneumatic tubes connect their respective chambers in fluid communication with one or more pressure transducers for generating multi-function air-data probe data.

7. The air-data probe component as recited in claim 5, wherein the first, second, third, fourth, and fifth pneumatic tubes extend aft from the mandrel bulkhead along the probe axis through a necking section that is radially narrower than the mandrel bulkhead relative to the probe axis.

8. The air-data probe component as recited in claim 7, further comprising a bracer integral and monolithic with the first, second, third, fourth, and fifth pneumatic tubes aft of the necking section, wherein the bracer is radially wider than the mandrel bulkhead and radially wider than the necking section relative to the probe axis.

9. The air-data probe component as recited in claim 8, wherein aft of the bracer, the first, second, third, fourth, and fifth pneumatic tubes diverge from one another and from the probe axis as they extend in an aft direction away from the mandrel bulkhead with respect to the probe axis.

10. The air-data probe component as recited in claim 8, wherein aft of the bracer, aft ends of the first, second, third, fourth, and fifth pneumatic tubes are configured to be connected in fluid communication with one or more pressure transducers for generating multi-function air-data probe data.

11. The air-data probe component as recited in claim 1, further comprising an outer cover tip engaged about the mandrel bulkhead with a plurality of bores therethrough for fluid communication of outside air pressure into the plurality of pneumatic tubes through the outer cover tip.

12. The air-data probe component as recited in claim 11, wherein an inner surface of the outer cover tip and an outer surface of the mandrel bulkhead conform to one another.

13. The air-data probe component as recited in claim 12, further comprising a heater wire seated in a channel defined in the outer surface of the mandrel bulkhead, wherein coils of the heater wire are enclosed between the mandrel bulkhead and the outer cover tip.

14. The air-data probe component as recited in claim 13, wherein the additively manufactured inner member includes a bracer integrally formed and monolithic therewith, wherein the bracer extends outward from the plurality of pneumatic tubes relative to the probe axis, wherein an outer surface of the bracer conforms to and engages with an inner surface of the outer cover tip.

15. The air-data probe component as recited in claim 11, wherein the outer cover tip includes a forward surface and an aft surface aft of the forward surface along the probe axis, wherein the forward surface is configured to be flush, conformal, and continuous with an aerodynamic outer surface of an aircraft, and wherein the aft surface is configured to extend inside the aerodynamic outer surface.

16. The air-data probe component as recited in claim 11, wherein the outer cover tip includes a temperature probe seated a in wall of the outer cover tip that separates from an external environment and an interior space inside the outer cover tip housing the mandrel bulkhead.

17. The air-data probe component as recited in claim 1, further comprising a plurality of internal sensors in fluid communication with the plurality of pneumatic tubes for generating multi-function air-data.

18. The air-data probe component as recited in claim 17, further comprising a data controller operatively connected to the plurality of internal sensors and configured to interface with an aircraft system to communicate multi-function air-data to the aircraft system.

19. An air data probe for use in an aircraft body that defines an aerodynamic outer surface comprising:
   an air-data probe including:
      an additively manufactured inner member including integrally formed, monolithic structures including:
         a mandrel bulkhead defining a plurality of pneumatic chambers therein in fluid communication with an outer surface of the mandrel bulkhead through respective pressure ports;
         a plurality of pneumatic tubes extending aft of the mandrel bulkhead along a probe axis, each in fluid communication with a respective one of the plurality of pneumatic chambers; and
      an outer cover tip engaged about the mandrel bulkhead with a plurality of bores therethrough for fluid communication of outside air pressure into the plurality of pneumatic tubes through the outer cover tip, wherein the outer cover tip includes a forward surface and an aft surface aft of the forward surface along the probe axis, wherein the forward surface is flush, conformal, and continuous with the aerodynamic outer surface, and wherein the aft surface is configured to extend inside the aerodynamic outer surface,
      wherein the aerodynamic outer surface and the outer cover tip are not integrally formed, monolithic structures with one another,
      wherein the aerodynamic outer surface and the additively manufactured inner member are not integrally formed, monolithic structures with one another, and
      wherein the outer cover tip and the additively manufactured inner member are not integrally formed, monolithic structures with one another.

20. The air data probe as recited in claim 19, herein the plurality of pneumatic tubes connect their respective chambers in fluid communication with one or more pressure transducers for generating multi-function air-data probe data.

* * * * *